Feb. 6, 1968  D. S. ROWLEY  3,367,430
COMBINATION DRILL AND REAMER BIT
Original Filed March 30, 1964  2 Sheets-Sheet 1
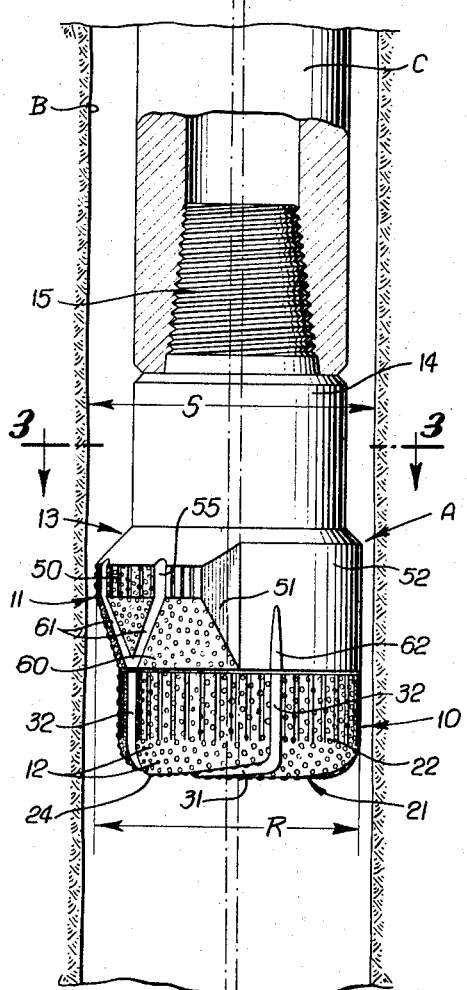
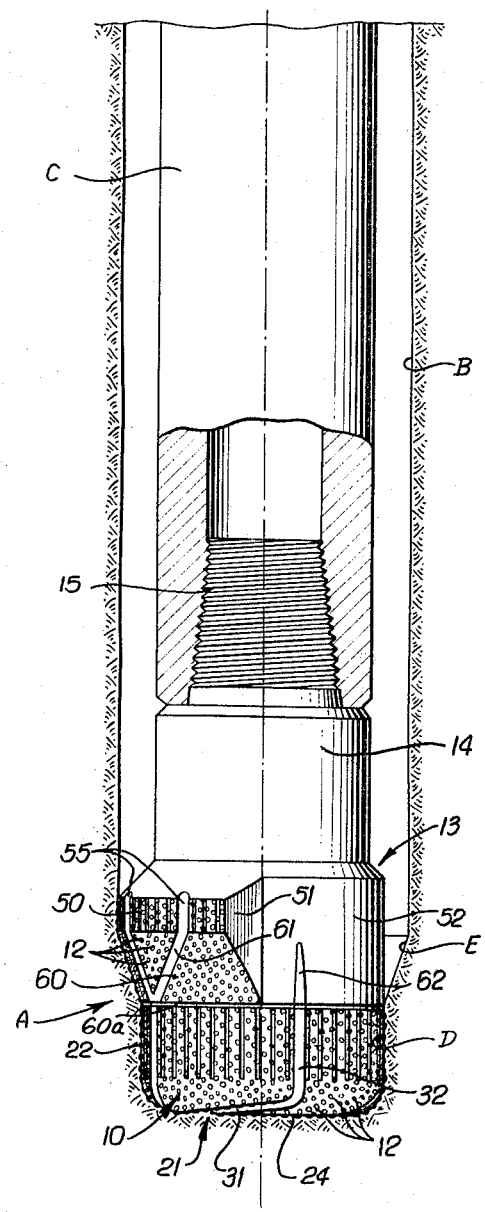
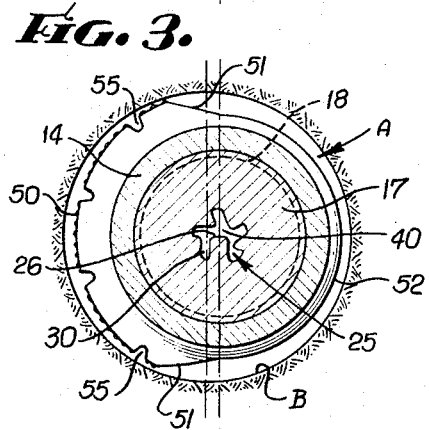
INVENTOR.
DAVID S. ROWLEY
BY
Bernard Kriegel
ATTORNEYS.

Feb. 6, 1968
D. S. ROWLEY
3,367,430
COMBINATION DRILL AND REAMER BIT
Original Filed March 30, 1964
2 Sheets-Sheet 2
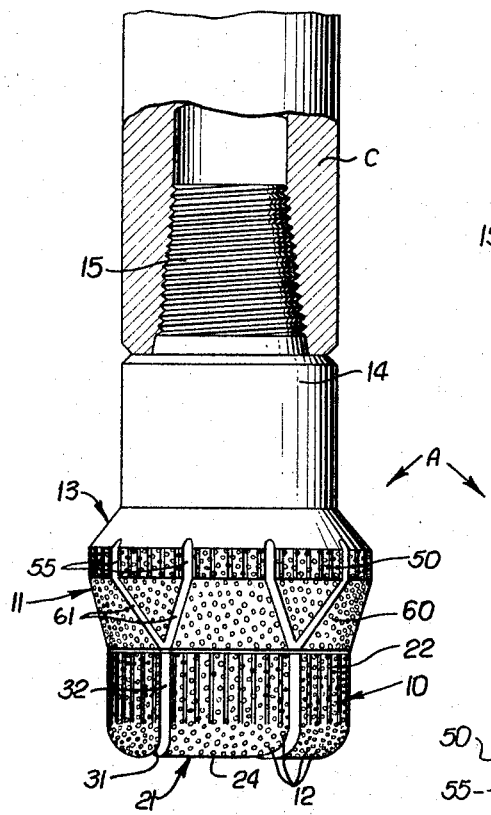
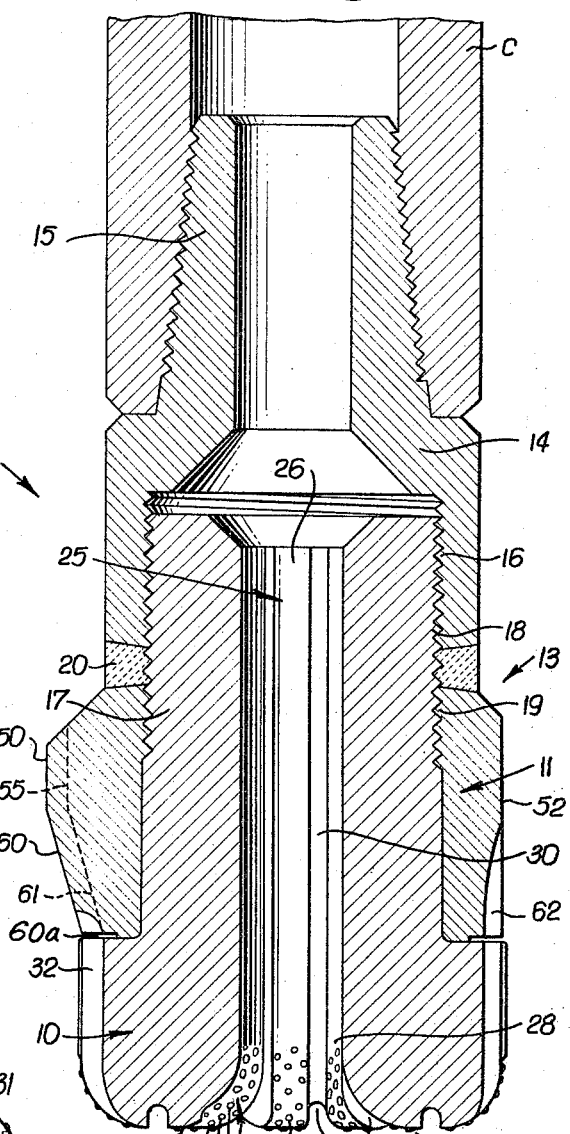
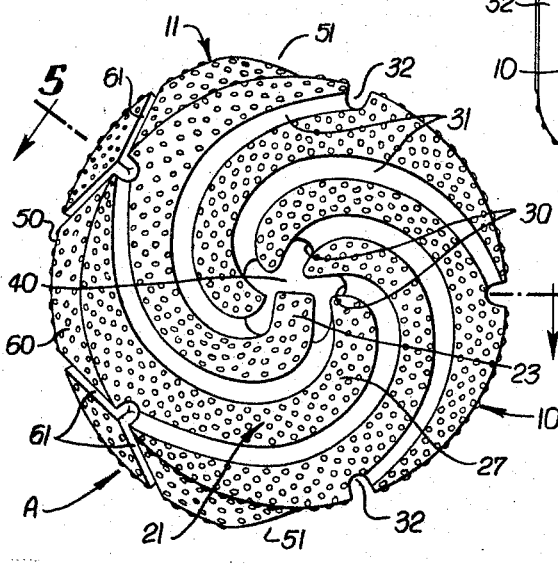
INVENTOR.
DAVID S. ROWLEY
BY
Bernard Kriegel
ATTORNEYS.

United States Patent Office 3,367,430
Patented Feb. 6, 1968

3,367,430
COMBINATION DRILL AND REAMER BIT
David S. Rowley, Salt Lake City, Utah, assignor to Christensen Diamond Products Company, Salt Lake City, Utah, a corporation of Utah
Continuation of application Ser. No. 355,619, Mar. 30, 1964. This application Aug. 24, 1966, Ser. No. 575,493
14 Claims. (Cl. 175—385)

This application is a continuation of my application for "Combination Drill and Reamer Bit," Ser. No. 355,-619, filed Mar. 30, 1964, now abandoned.

The present invention relates to rotary drill bits, and more particularly to diamond bits for drilling bore holes in rock, and other relatively hard formation.

Rotary drill bits embodying diamond cutting elements have been used for drilling bore holes, especially in hard formations. Heavy drags have been encountered along the walls of the bore holes in elevating and lowering the bits from and toward the hole bottoms. Avoidance of the drag difficulty has been attempted through use of bits having a maximum overall lateral dimension or diameter less than the diameter of the hole being drilled. Prior bits of this type, however, have tended to drill an undersize hole, have encountered difficulty in flushing the cuttings from the drilling region and in cleaning and cooling the bit, and produce a breakdown of the formation at the reamer section of the bit.

It is an object of the present invention to provide an improved rotary drill bit embodying diamond cutting elements, or the like, which is capable of drilling a full gauge bore hole in hard formations without dragging along the wall of the hole during longitudinal movement away from and toward its bottom.

Another object of the invention is to provide a rotary drill bit embodying diamond cutting elements, or the like, which is capable of drilling a bore hole of a diameter greater than the maximum overall lateral dimension of the bit itself, the bit operating in a comparatively stable manner and effectively resisting the tendency of the formation to shift it laterally inwardly and result in the drilling of an undersized hole.

A further object of the invention is to provide a rotary drill bit embodying diamond cutting elements, or the like, capable of drilling a bore hole of a diameter greater than the maximum overall lateral dimension of the bit itself, the bit including a lower pilot portion and an upper reamer portion that does not tend to break down the formation at its lower end.

An additional object of the invention is to provide a rotary drill bit embodying diamond cutting elements, or the like, capable of drilling a bore hole of a diameter greater than the maximum overall lateral dimension of the bit itself, the bit including a lower pilot portion and an upper reamer portion, in which the reamer portion is thoroughly flushed with drilling mud, or other fluid, to insure removal of the cuttings and retention of the reamer portion in a clean and cool state.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view of a drill bit embodying the invention disposed in the well bore and elevated off the bottom of the latter;

FIG. 2 is a view corresponding to FIG. 1 illustrating the drill bit in position for performing a drilling action upon the formation;

FIG. 3 is a cross-section taken along the line 3—3 on FIG. 1;

FIG. 4 is a front elevation of the bit as seen from the left side of FIGS. 1 and 2;

FIG. 5 is an enlarged longitudinal section through the drill bit attached to a drill string, taken generally along the line 5—5 on FIG. 6;

FIG. 6 is a bottom plan view of the drill bit disclosed in FIG. 5;

FIG. 7 is an enlarged fragmentary section of a portion of the bit.

A combination bit A is illustrated in the drawings, including a lower drill or pilot portion 10 and an upper reamer portion 11. The combination bit is adapted to drill a bore hole B by virtue of drilling torque transmitted to it through a tubular string of drill pipe C, which also imposes the desired drilling weight to the bit.

The specific structure of the drill bit is shown somewhat diagrammatically in FIG. 5, since its matrix portions, in which diamond cutting elements 12 are embedded, are not separately illustrated. The manner of affixing diamond cutting elements to the various bit portions forms no part of the present invention. Any suitable and specific arrangement can be employed within the scope of the present invention.

As disclosed, the combination bit includes a bit body or shank 13, consisting of several sections. Thus, an upper section 14 has a threaded pin 15 for threadedly securing the bit to the lower end of the string of drill pipe C. This upper section has an internal thread 16 for threadedly securing it to the external thread 18 of a lower body or shank section 17 of the pilot bit portion 10. The reamer portion 11 surrounds the section 17 between the pilot bit portion and the upper bit section 14, having internal threads 19 threadedly meshing with the external threads 18 on the lower bit body section. The upper body section or shank 14, the lower section 17 and the intermediate reamer portion or section 11 are firmly secured or integrated to one another, as by depositing welding material 20 circumferentially around the lower section 17 and between the lower end of the upper section 14 and the upper end of the reamer section 11. Thus, all of the sections are integrated to one another by virtue of their threaded and welded interconnections.

The pilot portion 10 of the bit is adapted to drill a hole D of a smaller diameter than the final diameter B desired, which is cut or drilled by the upper reamer portion 11. The lower drill face 21 of the pilot portion of the bit may have any desired specific configuration, the particular one disclosed having been found effective in diamond drilling hard formations. The pilot bit portion 10 includes an outer reaming face 22 for insuring the cutting of the pilot hole D to a desired diameter, and also a central conical-like face 23 for drilling the central portion of the hole, producing an upwardly projecting cone in the bottom of the formation which will assist in centering the bit in the well bore. Between the reaming face 22 and the frusto-conical inner face 23, the bit has a generally convex face 24 for drilling the outer portion of the bottom of the hole, this face merging into the outer reaming face 22 and also into the lower large end of the frusto-conical face 23.

The pilot bit performs its cutting action on the formation primarily through the action of the diamond cutting elements 12 embedded in the reaming, convex and frusto-conical or concave faces 22, 24, 23 of the bit. These diamond cutting elements are embedded in a known manner in a matrix (not separately shown) of relatively hard material molded to the lower portion of the bit body or shank 17.

The cuttings produced by the diamond cutting elements 12, and to some extent by the matrix itself, are removed by circulating or pumping fluid, such as drilling mud, down through the drill pipe C, which will pass through the threaded pin 15 and into the upper bit body end of an upper central passage 25 in the lower bit body section 17, and then downwardly into the concave or frusto-conical portion 23 of the bit. The fluid is caused to pass between a plurality of longitudinally extending and circumferentially spaced ribs 26 projecting laterally inwardly from the wall of the central passage, these ribs merging into lands 27 extending in spiral fashion along the frusto-conical cutting face 23 of the bit and then along the convex cutting face 24, the spirals extending outwardly substantially to the cylindrical reaming face 22. Actually, the spiral lands 27 are spaced from one another circumferentially around the bit. Each land may be considered as beginning at the lower end 28 of the longitudinal rib 26, which lower end is located at the upper end of the frusto-conical face 23 of the bit, continuing smoothly along the frusto-conical face and convex face 24 to the reaming face 22. The ribs 26 are separated by longitudinal grooves 30 opening at their lower ends into circumferentially spaced spiral waterways 31 that actually bound and define the spiral lands 27 in the frusto-conical and convex faces 23, 24 of the pilot bit. In effect, each watercourse 31 has its inlet at the lower portion of a longitudinal groove 30, and its outlet at the reaming face 22, such outlets merging into vertical waterways 32 in the remaining face extending upwardly to the upper end of the latter.

The diamond elements 12, or corresponding elements, of the proper size embedded in the faces 22, 23, 24 of the bit operate upon the formation material and cut the pilot hole D to the desired diameter. The reaming diamonds or stones 12 extend upwardly along the reaming face 22 substantially to its upper end.

The ribs 26 do not extend inwardly into contact with one another, there being a transverse space or gap 40 therebetween. This transverse space or gap permits circulating fluid to discharge downwardly upon the central portion of the cone formed in the hole bottom by the concave or frusto-conical inner face 23 during rotation of the bit. As the bit rotates, the frusto-conical face bears upon the companion generally conical central portion of the hole bottom; whereas, the convex face 24 forms a companion concave configuration in the outer portion of the bottom of the hole, this configuration merging into the cylindrical wall of the hole D at its outer portion and into the lower end of the cone at its inner portion. The contacting of the several face portions by the hole bottom causes the latter to substantially cover the waterways 31, which may then be considered as passages or conduits through which the circulating fluid can flow for the purpose of flushing the cuttings from the drilling region outwardly toward the periphery of the bit, and thence upwardly through the circumferentially spaced vertical waterways 32 in the reaming face 22 of the bit. The flushing fluid also passes across the lands 27 and the reaming face segments between the vertical waterways 32 to maintain them clean of cuttings.

The reamer portion 11 of the drill bit includes a generally cylindrical upper drilling face 50 extending radially from the bit axis to a substantially greater distance than the reaming face 22 of the pilot bit portion 10. The cylindrical reaming face 50 of the reamer portion extends arcuately for a distance substantially less than 180 degrees, the ends 51 of the reaming face extending inwardly toward a non-reaming or non-cutting surface 52 on the reamer section, which may also lie on the surface of a right cylinder and which preferably has a radius that is no greater than the radius of the reaming face 22 of the pilot bit portion. Thus, a longitudinal generally cylindrical drilling face 50 is provided on the reamer portion that extends laterally outwardly beyond the reaming face 22 of the pilot bit portion capable of enlarging the bore hole to a diameter B that is substantially greater than the hole diameter D produced by the pilot bit portion.

The face 50 of the cylindrical reaming portion may also have diamond or other cutting elements 12 embedded in its matrix, which may, for example, be arranged in spaced parallel vertical rows. The drilling face of the reamer portion also has circumferentially spaced vertical waterways 55 therein through which cuttings can be carried by the drilling fluid in an upward direction for continued upward movement around the drill bit shank 14 and the drill pipe C to the top of the bore hole.

To prevent an abrupt shoulder from being produced in the formation between the relatively smaller diameter pilot hole D and the larger diameter hole B cut by the reamer portion 11 of the bit, an intermediate tapered or frusto-conical reaming portion 60 extends from the upper end of the reaming face 22 of the pilot bit portion to the lower end of the reamer drilling face 50. This frusto-conical or tapered portion also extends substantially the same arcuate distance around the bit as the reaming face 50 at its upper end, and may extend a greater distance, but preferably no greater than 180 degrees, at its lower end adjacent to the upper end of the reaming face 22 of the pilot bit portion 10. The tapered reaming face 60 also has a suitable pattern of diamond cutting elements 12, or similar cutting elements, embedded in its matrix for cutting action upon the formation to enlarge the diameter of the well bore D produced by the pilot portion 10.

The tapered reaming face 60 is inclined at a relatively shallow angle to the axis of the bit, which, for example, may be of the order of about 10 or 15 degrees. Thus, a tapered wall surface E is formed between the wall of the pilot hole D drilled by the pilot bit portion and the wall B of the hole produced by the reamer portion 50, which makes a relatively shallow angle to the axis of the bit and which, therefore, does not readily break down under the drilling weight and torque applied thereto by the steeply tapered intermediate hole enlarging face 60.

To insure the appropriate flushing of cuttings from the drilling region, the generally vertical or longitudinal waterways 32 in the reaming surface 22 of the pilot bit portion merge into the lower ends of longitudinal waterways 61 provided in the tapered hole enlarging face 60, these tapered or inclined waterways merging into the longitudinal waterways 55 in the drilling face 50 of the upper reamer portion. A pair of waterways 61 in the tapered hole enlarging face 60 may intersect at the lower end of such face, and such pair will communicate with the upper end of a waterway 32 in the reaming face of the pilot bit portion. In effect, the waterways 61 in the tapered face diverge upwardly from one another, with their upper ends each communicating with a longitudinal waterway 55 in the drilling face 50 of the upper reamer portion. The several waterways 32, 61, 55 are closed by the formation itself, so that substantially continuous conduits are provided for the drilling fluid, which will flow upwardly from the waterways 32 in the reaming face 22 of the pilot bit portion into the waterways 61 in the tapered portion 60, continuing upwardly through the waterways 55 in the reamer portion, all at substantial velocity, the cuttings being carried upwardly around the bit body shank 14 and the drill pipe C to the top of the hole. The drilling fluid will also pass between the formation and the surfaces of the tapered drilling face 60 and the upper reaming face 50 to clean and maintain such faces and the diamond cutting elements 12 embedded therein in a clean and cool condition. A circumferential groove 60a is provided between the upper end of the pilot bit portion 10 and the lower end of the tapered portion 60 to allow flow of drilling fluid from the waterways 32 circumferentially around the bit and upwardly over the tapered face 60 and the diamond cutting elements embedded therein between the waterways 61, to secure full coverage of the drilling fluid over the entire area of the tapered face 60 and the reaming face 50 thereabove.

As disclosed most clearly in FIG. 7, the lower end 60b of the tapered reaming face 60 has a radius from the axis of the bit slightly less than the radius of the reaming face 22 of the pilot portion 10; that is, the end 60b is disposed laterally inwardly of the upper outer end 22a of the face 22 to a small extent. As a result of this relation, a circumferential fluid passage 60c of triangular cross-section is formed between the wall of the pilot hole D, the upper end of the pilot portion 10 and the lower portion of the tapered reaming face 60, and this passage 60c will also receive fluid from the waterways 32 and distribute it circumferentially around the bit and upwardly over the tapered face 60.

To further insure the upward carrying of the cuttings from the drilling region, the grooves or waterways 32 in the reaming face 22 of the pilot bit portion opposite the tapered and upper reaming faces 60, 50 communicate with vertical waterways 62 in the non-reaming face 52 of the reamer portion of the bit, which will discharge drilling fluid and cuttings upwardly and outwardly into the enlarged hole B, carrying the cuttings upwardly around the upper bit body section 14 and the drill string C to the top of the well bore.

It is to be noted that the axis of rotation of the bit A is determined by its pilot portion 10, which will center the bit in the hole. The drilling faces 60, 50 of the upper reamer portion 11, which are offset laterally beyond the reaming face 22 of the pilot bit portion 10, will enlarge the hole to the required final diameter B and also rotate about the axis of the pilot hole D. There is a tendency for the formation, and particularly hard formations, to shift the bit laterally inwardly from the reamer face 50 in a direction toward the non-reaming face 52 of the bit, which would result in the drilling of an undergauge hole B. However, such tendency is prevented with the present bit arrangement by the conical central portion produced by the inner conical drilling face 23 of the pilot bit portion, and predominantly by the substantial surface of contact provided by the reaming face 22 of the pilot bit portion against the wall of the pilot hole. It is evident that any tendency for the tapered reaming face 60 and the upper reaming face 50 to shift the bit in a direction diametrically opposite thereto will be resisted by the diametrically opposite cylindrical surface 22 of the reaming face of the pilot bit portion. Thus, the drill bit A remains centered for continuing rotation about the axis of the pilot hole D formed by the pilot bit portion 10.

Because of the fact that the upper reamer portion 50 of greater hole diameter drilling capability extends substantially less than 180 degrees around the bit, the maximum lateral dimension of the bit is substantially less than the diameter of the enlarged hole B produced by the upper reamer portion. This is evident from FIG. 1, for example, which discloses that the maximum overall lateral dimension or diameter of the bit R is substantially less than the diameter S of the hole B that the bit is capable of drilling when the pilot portion 10 is on bottom and drilling the pilot hole D, with the upper reamer portion 11 enlarging the diameter of the pilot hole to the final diameter S. Accordingly, upon elevation of the drill bit A from the bottom of the hole to remove the pilot bit 10 from the pilot hole, there is no substantial tendency for the bit to drag along the wall of the enlarged bore B as the bit is elevated therein, or lowered therein toward the bottom of the hole. Substantial clearance exist because of the fact that the diameter S of the hole B is substantially greater than the maximum overall lateral dimension R of the bit. Accordingly, the drill bit can be moved longitudinally in the well bore without encountering the heavy drags that are sometimes present when a drill bit is employed having its reaming portion completely around its circumference.

Not only does the drill bit A disclosed avoid the heavy drags heretofore encountered during its movement upwardly and downwardly in the hole B along the wall of the latter, but its offset portion 60, 50 does not tend to cause the bit to be pinched inwardly by the hard formation, in view of the large counteracting surface provided by the reaming face 22 of the pilot portion 10 of the bit opposite to the upper drilling faces 60, 50 of the upper reamer portion 11.

Despite the substantial difference in diameters between the pilot hole D and the enlarged hole B thereabove, the steeply inclined tapered reaming face 60 prevents the formation of abrupt shoulders in the well bore, and avoids breakdown of rocks and other hard formations that could occur where an abrupt shoulder or increase in diameter between the pilot hole D and the final size hole B is present. Such steeply tapered intermediate drilling face 60 also enables waterways 61 to be provided which interconnect waterways 32 in the reaming face 22 of the pilot bit with waterways 55 in the drilling face 50 of the upper reamer portion, insuring continuity of flow of the drilling fluid and the cuttings upwardly through the reaming portion 11 of the bit, for suitable upward carrying around the drill pipe C to the top of the hole. Thus, the maintenance of the drilling region of the hole, as well as the several cutting faces of the bit, in a clean condition is insured, enabling the drill bit to operate with maximum effectiveness upon the formation at all times. Not only are the cuttings carried away from the pilot hole D, but the channeling of the drilling fluid and cuttings upwardly through the tapered reaming face 60 and the reamer face 50 itself insures the thorough flushing of the upper reamer portion 11 of the bit.

I claim:

1. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said reamer portion having a third reaming face extending between said first reaming face and second reaming face and inclined upwardly and outwardly from said first reaming face to said second reaming face; said third reaming face having cutting elements thereon; said first reaming face also being disposed at least diametrically opposite the mid-portion of said third reaming face; the upper end of said first reaming face extending laterally outwardly beyond the lower end of said third reaming face to provide a circumferential fluid passage of generally triangular cross-section between the upper end of said pilot portion, the lower portion of said inclined third reaming face and the wall of the pilot bore hole produced by the lower pilot portion.

2. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said reamer portion having a third reaming face extending between said first reaming face and second reaming face and inclined upwardly and outwardly from said first reaming face to said second reaming face at a shallow angle of about 10 to 15 degrees to the body structure axis; the upper end of said third reaming face being substantially coextensive arcuately with said second reaming face; said third reaming face having cutting elements thereon; said first reaming face also being disposed at least diametrically opposite the mid-portion of said third reaming face.

3. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said reamer portion having a third reaming face extending between said first reaming face and second reaming face and inclined upwardly and outwardly from said first reaming face to said second reaming face at a shallow angle to the body structure axis; the upper end of said third reaming face being substantially coextensive arcuately with said second reaming face; said third reaming face having cutting elements thereon; said first reaming face also being disposed at least diametrically opposite the mid-portion of said third reaming face; the upper end of said first reaming face extending laterally outwardly beyond the lower end of said third reaming face to provide a circumferential fluid passage of generally triangular cross-section between the upper end of said pilot portion, the lower portion of said inclined third reaming face and the wall of the pilot bore hole produced by the lower pilot portion.

4. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said body structure having a drilling fluid passage therein; said end drilling face having waterways communicating with said passage and extending to said first reaming face; said first reaming face having waterways extending upwardly from and communicating with said end face waterways; said reamer portion and its second reaming face having waterways extending upwardly from and communicating with said first reaming face waterways; the upper part of said pilot portion and the lower part of said reamer portion having a circumferential groove therebetween communicating with the upper ends of said first reaming face waterways and the lower ends of said second reaming face waterways.

5. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said body structure having a drilling fluid passage therein; said end drilling face having waterways communicating with said passage and extending to said first reaming face; said first reaming face having waterways extending upwardly from and communicating with said end face waterways; said reamer portion and its second reaming face having waterways extending upwardly from and communicating with said first reaming face waterways; the upper end of said first reaming face extending laterally outwardly beyond the lower end of said third remaining face to provide a circumferential fluid passage of generally triangular cross-section between the upper end of said pilot portion, the lower portion of said inclined third reaming face and the wall of the pilot bore hole produced by the lower pilot portion; said waterways in said first reaming face and second reaming face communicating with said circumferential fluid passage.

6. In a rotary bit as defined in claim 4; the upper end of said first reaming face extending laterally outwardly beyond the lower end of said third reaming face to provide a circumferential fluid passage of generally triangular cross-section between the upper end of said pilot portion, the lower portion of said inclined third reaming face and the wall of the pilot bore hole produced by the lower pilot portion; said waterways in said first reaming face and second reaming face communicating with said circumferential fluid passage; said circumferential groove communicating with said circumferential fluid passage and the lower ends of said second reaming face waterways.

7. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said reamer portion having a third reaming face extending between said first reaming face and second reaming face and inclined upwardly and outwardly from said first reaming face to said second reaming face at a shallow angle of about 10 to 15 degrees to the body structure axis; said third reaming face having cutting elements thereon; said first reaming face being disposed at least diametrically opposite the mid-portions of said second and third reaming faces; said body structure having a drilling fluid passage therein; said end drilling face having waterways communicating with said passage and extending to said first reaming face; said first reaming face having waterways extending upwardly from and communicating with said end drilling face waterways; said third reaming face having waterways extending upwardly from and communicating with said first reaming face waterways; said second reaming face having waterways extending upwardly from and communicating with said third reaming face waterways.

8. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said reamer portion having a third reaming face extending between said first reaming face and second reaming face and inclined upwardly and outwardly from said first reaming face to said second reaming face at a shallow angle to the body structure axis; said third reaming face having cutting elements thereon; said first reaming face being disposed at least diametrically opposite the mid-portions of said second and third reaming faces; said body structure having a drilling fluid passage therein; said end drilling face having waterways communicating with said passage and extending to said first reaming face; said first reaming face having waterways extending upwardly from and communicating with said end drilling face waterways; said third reaming face having waterways extending upwardly from and communicating with said first reaming face waterways; said second reaming face having waterways extending upwardly from and communicating with said third reaming face waterways; the upper part of said pilot portion and the lower part of said reamer portion having a circumferential groove therebetween communicating with the upper ends of said first reaming face waterways and the lower ends of said third reaming face waterways.

9. In a rotary bit for drilling a well bore hole: a body structure including a lower pilot portion and a reamer portion above said pilot portion; said pilot portion including a lower end drilling face having cutting elements thereon for drilling on the bottom of the bore hole and a first elongate reaming face substantially parallel to the body structure axis and having cutting elements thereon; said reamer portion having a second reaming face substantially parallel to the body structure axis and extending arcuately around the reamer portion substantially less than 180 degrees, said second reaming face having cutting elements thereon and having a radius substantially greater than the radius of said first reaming face; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said first reaming face being disposed at least diametrically opposite the mid-portion of said second reaming face; said reamer portion having a third reaming face extending between said first reaming face and second reaming face and inclined upwardly and outwardly from said first reaming face to said second reaming face at a shallow angle to the body structure axis; said third reaming face having cutting elements thereon; said first reaming face being disposed at least diametrically opposite the mid-portions of said second and third reaming faces; said body structure having a drilling fluid passage therein; said end drilling face having waterways communicating with said passage and extending to said first reaming face; said first reaming face having waterways extending upwardly from and communicating with said end drilling face waterways; said third reaming face having waterways extending upwardly from and communicating with said first reaming face waterways; said second reaming face having waterways extending upwardly from and communicating with said third reaming face waterways; the upper end of said first reaming face extending laterally outwardly beyond the lower end of said third reaming face to provide a circumferential fluid passage of generally triangular cross-section between the upper end of said pilot portion, the lower portion of said inclined third reaming face and the wall of the pilot bore hole produced by the lower pilot portion.

10. In a rotary bit as defined in claim 9; the upper part of said pilot portion and the lower part of said reamer portion having a circumferential groove therebetween communicating with the upper ends of said first reaming face waterways and the lower ends of said third reaming face waterways; said circumferential groove opening into said circumferential fluid passage.

11. In a rotary drill bit for drilling a well bore hole: a body structure including a lower pilot portion and a reamer portion above said pilot portion; said body structure having a drilling fluid passage therein; said pilot portion including a lower end drilling face having a plurality of waterways therein communicating with said fluid passage and a first elongate cylindrical reaming face extending completely around said pilot portion and having circumferentially spaced waterways communicating with the outer ends of said end face waterways and extending upwardly therefrom; said reamer portion having a second reaming face substantially parallel to the body structure axis and extending arcuately around the reamer portion substantially less than 180 degrees, said second reaming face having a radius substantially greater than the radius of said first reaming face; said reamer portion and its second reaming face having circumferentially spaced waterways extending upwardly from and communicating with the upper ends of said first reaming face waterways; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said end drilling face, first reaming face, and second reaming face having cutting elements thereon; said reamer portion having a third reaming face extending between said first reaming face and second reaming face and inclined upwardly and outwardly from said first reaming face to said second reaming face at a shallow angle of about 10 to 15 degrees to the body structure axis; said third reaming face having waterways extending upwardly from said first reaming face waterways to said second reaming face waterways; said third reaming face having cutting elements thereon.

12. In a rotary drill bit for drilling a well bore hole: a body structure including a lower pilot portion and a reamer portion above said pilot portion; said body structure having a drilling fluid passage therein; said pilot portion including a lower end drilling face having a plurality of waterways therein communicating with said fluid passage and a first elongate cylindrical reaming face extending completely around said pilot portion and having circumferentially spaced waterways communicating with the outer ends of said end face waterways and extending upwardly therefrom; said reamer portion having a second reaming face substantially parallel to the body structure axis and extending arcuately around the reamer portion substantially less than 180 degrees, said second reaming face having a radius substantially greater than the radius of said first reaming face; said reamer portion and its second reaming face having circumferentially spaced waterways extending upwardly from and communicating with the upper ends of said first reaming face waterways; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said end drilling face, first reaming face, and second reaming face having cutting elements thereon; said reamer portion having a third reaming face extending between said first reaming face and second reaming face and inclined upwardly and outwardly from said first reaming face to said second reaming face at a shallow angle to the body structure axis; said third reaming face having waterways extending upwardly from said first reaming face waterways to said second reaming face waterways; said third reaming face having cutting elements thereon; the upper part of said pilot portion and the lower part of said reamer portion having a circumferential groove therebetween communicating with the upper ends of said first reaming face waterways and the lower ends of said third reaming face waterways.

13. In a rotary drill bit for drilling a well bore hole: a body structure including a lower pilot portion and a reamer portion above said pilot portion; said body structure having a drilling fluid passage therein; said pilot portion including a lower end drilling face having a plurality of waterways therein communicating with said fluid passage and a first elongate cylindrical reaming face extending completely around said pilot portion and having circumferentially spaced waterways communicating with the outer ends of said end face waterways and extending upwardly therefrom; said reamer portion having a second reaming face substantially parallel to the body structure axis and extending arcuately around the reamer portion substantially less than 180 degrees, said second reaming face having a radius substantially greater than the radius of said first reaming face; said reamer portion and its second reaming face having circumferentially spaced waterways extending upwardly from and communicating with the upper ends of said first reaming face waterways; said reamer portion having a non-reaming face opposite said second reaming face and extending arcuately substantially more than 180 degrees around said reamer portion from and between the opposite ends of said second reaming face; said non-reaming face having a radius substantially less than the radius of said second reaming face; said end drilling face, first reaming face, and second reaming face having cutting elements thereon; said reamer portion having a third reaming face extending between said first reaming face and second reaming face and inclined upwardly and outwardly from said first reaming face to said second reaming face at a shallow angle to the body structure axis; said third reaming face having waterways extending upwardly from said first reaming face waterways to said second reaming face waterways; said third reaming face having cutting elements thereon; the upper end of said first reaming face extending laterally outwardly beyond the lower end of said third reaming face to provide a circumferential fluid passage of generally triangular cross-section between the upper end of said pilot portion, the lower portion of said inclined third reaming face and the wall of the pilot bore hole produced by the lower pilot portion.

14. In a rotary drill bit is defined in claim 13; the upper part of said pilot portion and the lower part of said reamer portion having a circumferential groove therebetween communicating with the upper ends of said first reaming face waterways and the lower ends of said third reaming face waterways, said circumferential groove opening into said circumferential fluid passage.

References Cited

UNITED STATES PATENTS

| 2,009,742 | 7/1935 | Mitchell | 175—329 |
| 2,053,801 | 9/1936 | Mitchell | 175—387 X |
| 2,838,284 | 6/1958 | Austin | 175—329 |
| 2,953,354 | 9/1960 | Williams | 175—329 |

FOREIGN PATENTS

| 1,430 | 5/1900 | Austria. |

OTHER REFERENCES

"Williams Bi-Center Diamond Bits," publication; Apr. 20, 1960, published by the Williams Bit & Tool Co., Inc. of Greenville, Tex.

CHARLES E. O'CONNELL, *Primary Examiner.*

NILE C. BEYERS, JR., *Assistant Examiner.*